Oct. 21, 1952     L. R. CLAUSEN     2,614,405

POWER TAKE-OFF COUPLING

Filed June 19, 1947

Inventor:
Leon R. Clausen.
By Soans, Pond & Anderson
Attys.

Patented Oct. 21, 1952

2,614,405

UNITED STATES PATENT OFFICE 2,614,405

POWER TAKE-OFF COUPLING

Leon R. Clausen, Racine, Wis., assignor to J. I. Case Company, Racine, Wis., a corporation of Wisconsin Application June 19, 1947, Serial No. 755,643

4 Claims. (Cl. 64—23)

The present invention relates to power take-off couplings and, in particular, to an improved power take-off coupling which is adapted to extend between the power take-off shaft of a tractor or other draft vehicle and the implement or other device which is drawn by and powered from the tractor.

In spite of the use of safety shields and other precautions, the power take-off couplings that extend between tractors and their associated implements cause many serious injuries to the machine operators and much damage to the equipment. The elimination of this hazard is the principal object of the present invention.

Most agricultural implements have the power take-off coupling disposed above and vertically spaced from the implement draw bar, which is normally connected to the tractor by a draft pin, or the like. The usual power take-off coupling comprises a square or rectangular shaft which is adapted to slide freely within a similarly-shaped hollow tube. The power take-off couplings and draft connections are arranged so that the tractor may be backed to the implement and the parts engaged together. After the implement has been connected to the tractor, there is little danger of the draft connection becoming disengaged during the operation of the apparatus in the field. However, when the apparatus is drawn over a very rough field or over sharp rises or hummocks, the telescoping members of the power take-off coupling are extended and the inter-engagement of those members is shortened as the vertical angle between the draft vehicle and the implement changes. When the telescoping members are thus extended, they are liable to become disengaged if the total angular displacement is more than was anticipated when the apparatus was coupled. If the members become disengaged, the member attached to the tractor whips around and may cause injury to the operator and other damage.

A more common cause for disengagement comes about when the tractor coupled implement is parked or stopped for adjustment. At this time the draft pin may be removed, and when the operator drives the tractor forward the telescoping coupling members become disengaged and the member attached to the tractor rotates freely, as before described. The provision of a safe power take-off coupling thus becomes particularly important in the case of tractors which have the operator's seat positioned directly over the power take-off coupling and the universal joints.

More specifically stated, the object of the present invention is to provide an improved power take-off coupling which will allow free, relative, longitudinal movement between the tractor and its associated implement or vehicle, but which will, at the same time, positively limit the extension of the coupling to a determined, safe length so that it cannot pull apart during use. Other objects and advantages will be clear upon reference to the following description and the accompanying drawings.

Figure 1:
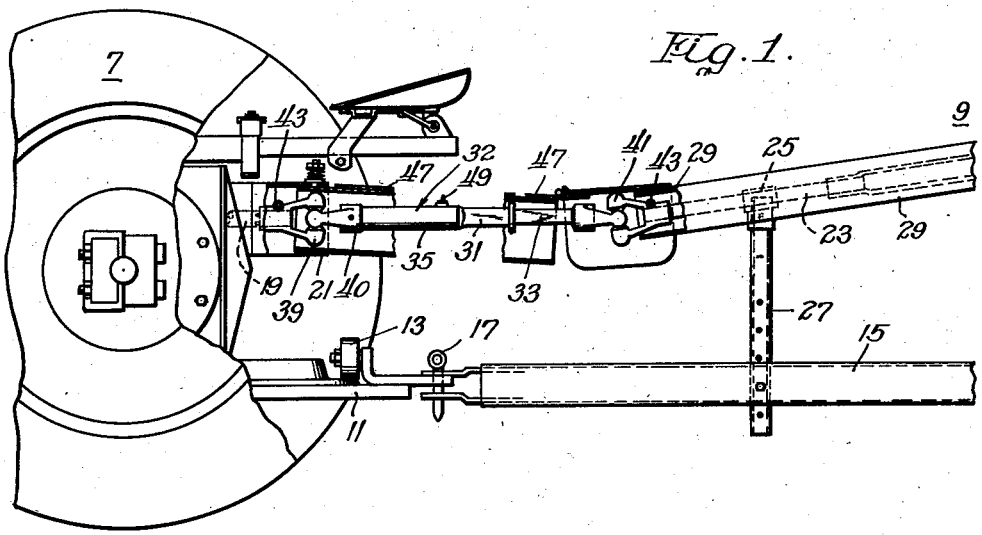
Fig. 1 is a fragmentary, side elevational view of a tractor and associated implement having a power take-off shaft coupling in accordance with the invention.
Figure 2:
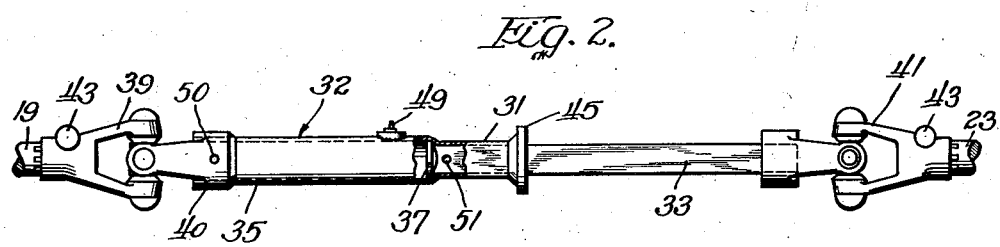
Fig. 2 is an enlarged, elevational view of the power take-off shaft coupling of Fig. 1 in the extended position.
Figure 3:
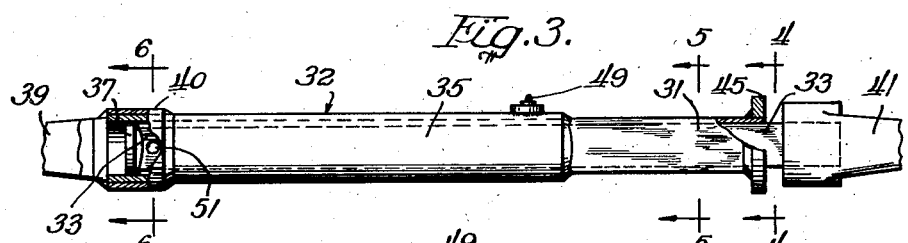
Fig. 3 is an enlarged, elevational view of the power take-off shaft coupling illustrated in the preceding figures in the shortened position.
Figure 4:
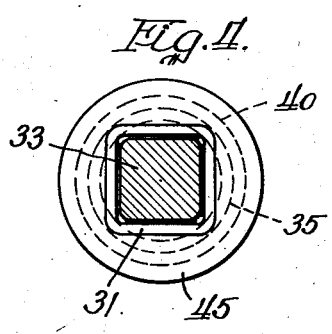
Fig. 4 is a sectional view taken on line 4—4 in Fig. 3.
Figure 5:
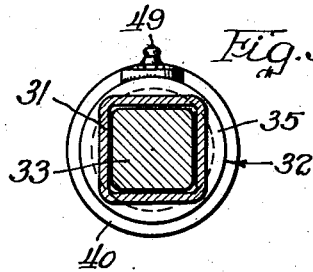
Fig. 5 is a sectional view taken on line 5—5 in Fig. 3.
Figure 6:
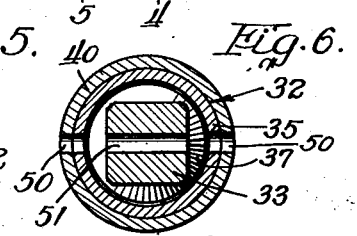
Fig. 6 is a sectional view taken on line 6—6 in Fig. 3.

In the apparatus illustrated, a tractor 7, is operatively connected to an associated implement, indicated generally, at 9. The draft connection includes a draft member 11 on the tractor 7 which is provided with a conventional roller connection 13 for facilitating sideward swinging between the implement 9 and the tractor 7 when turning the tractor during operation, and a vertically extending draft pin 17 connects the draft member 11 to a draft bar 15 which constitutes a part of the implement 9.

The power take-off on the tractor 7 includes a splined shaft 19, which extends outwardly from the rear of the tractor frame. For safety purposes, the splined shaft 19 is provided with a flared, sheet metal guard member 21, which is permanently attached to the tractor 7. The driven mechanism on the implement 9 is connected to a longitudinally extending power shaft 23 which is adjustably supported for vertical movement by suitable pedestal bearings 25 located on a vertical supporting member 27. The forward end of the power shaft 23 extends to a point adjacent the forward end of the draft bar 15. The power shaft 23 is protectively surrounded by a sheet metal guard member 29 to prevent the operator from coming in contact therewith.

In accordance with the invention, the power take-off coupling is adapted to extend between the splined shaft 19 on the tractor 7 and the power shaft 23 on the implement 9. The coupling comprises an inner shaft member 33 and an outer shaft member 32. The outer shaft member 32 is tubular in form and is adapted to engage the inner shaft member 33 with a sliding fit, as will hereinafter be described. The outer shaft 32 includes a short, substantially square tube member 31 of uniform cross-sectional area, which is adapted to receive the similarly shaped, inner shaft member 33. The shaft member 33 is proportioned to slide freely within the tube member 31. An enlarged tube 35, which is of circular outline in the illustrated structure and which has cross-sectional dimensions greater than those of the inner shaft member 33, is integrally connected to one end of the short tube member 31. The tube 35 is adapted to form an extension of the tube member 31 and is disposed with its center line coinciding with the longitudinally projected center line of the tube member 31. The short tube member 31 together with enlarged tube 35 form the outer shaft member 32.

An enlarged, piston-like head 37 is attached to the free end of the shaft 33 which is disposed within the enlarged circular tube 35. The piston head 37 is generally circular in cross section and is proportioned to slidably engage the inner surface of the tube 35. The piston head 37 may be fabricated from a piece of material separate from the shaft 33, or it may constitute an upset portion of the shaft 33 which is forged in a suitable die. The enlarged tube member 35 guides, and protectively surrounds, the head 37 on the end of the inner shaft 33 as it moves longitudinally within the outer shaft member 32. The co-action of the piston-like head 37 and the shoulder formed in the outer shaft member 32 between the short tube member 31 and the enlarged tubular member 35 effectively limits the longitudinal extension of the coupling.

A universal joint 39 is rigidly attached to the free end of the outer shaft member 32 in order to permit the necessary relative angular movement between the tractor 7 and the implement 9. The universal joint 39, in conformance with the usual practice, is provided with a hollow sleeve portion 40 which is proportioned to extend around the shaft member 32. This sleeve portion 40 also serves to reinforce the enlarged tubular portion 35 of the outer shaft 32.

A second universal joint 41 is attached to the extensible end of the inner shaft 33. These universal joints are each provided with a spring lock 43, one of which is adapted to positively engage the splined shaft 19 on the tractor 7 and the other of which is adapted to positively engage the power shaft 23 on the implement 7. A suitable reinforcing ring 45 may be provided about the smaller tube section 31, as illustrated.

An extensible safety shield 47 is connected between the flared guard member 21 around the splined shaft 19 on the tractor power take-off, and the power take-off shaft guard 29 on the implement. This shield 47 is adapted to be extended and shortened automatically in response to relative movement between the implement 9 and the tractor 7, and forms a part of a continuous guard which protects the power transmission means from the tractor 7 to the mechanism on the implement 9.

Lubrication of the contacting surfaces between the inner shaft 33 and the outer shaft member 32 is effected by introducing oil or grease into the enlarged tube section 35 through a pressure grease fitting 49 provided in the wall of the tube member 31. When a relatively large amount of grease or oil is maintained in the space between the piston and the shoulder, which is formed by the connection between the tubes 31 and 35, the piston acts as a combined hydraulic and pneumatic shock dampener which eases the sharp impact of metal-to-metal contact if the coupling is extended to its limit.

The power take-off coupling may be fabricated, as illustrated, from a square shaft, a small tube section of square cross section, and an enlarged cylindrical tube section as described, or the co-operating tubes and shaft may be of other suitable, co-operating shapes. When the power take-off coupling is to be used with different makes and models of apparatus, it may be desirable to provide co-operating holes in the outer and inner shaft members so that they may be positively locked together when they are in the closed position. For this purpose, a diametrically disposed hole 50 is provided in the sleeve portion 40 of the universal joint 39, and a co-operating hole 51 is provided in the shaft 33 adjacent the head 37. If operating conditions require a non-extensible power take-off coupling, a bolt (not shown) is inserted through the co-operating holes 50 and 51 so as to lock the inner and outer shafts together.

When the novel power take-off coupling of the invention is used to transmit power between two vehicles, the hazards of the prior art structures are eliminated or minimized. If the draft means between the vehicles becomes uncoupled while the implements are parked, the operator will become aware of the condition before damage results, because the power take-off coupling will pull the load until the tractor can be stopped. During operation in a rough field, the extensilble coupling members will not become disengaged, but will draw their share of the load when conditions tending to separate the members are encountered. In either event, the shock of metal-to-metal contact is greatly reduced by the dampening action of the piston head moving in the partially oil-filled, enlarged tube. The enlarged tubular member serves to guide the shaft, to protect the sliding surfaces from dirt, dust, and the corrosive action of the atmosphere, and to maintain a film of lubricant on the sliding surfaces.

The features of my invention that are believed to be new are expressly set forth in the appended claims.

I claim:

1. An extensible, power take-off coupling of the class described, comprising an inner shaft member having a square cross-section and an outer shaft member, said outer shaft member being tubular in form and having an enlarged portion, which is circular in cross-section, and a portion of reduced cross-sectional area, said portion of reduced cross-sectional area having a square cross-section and being proportioned to engage said inner shaft member with a sliding fit, the interengaging surfaces of said inner shaft member and said reduced area portion serving to operatively interconnect said shaft members for the transmission of rotary motion, said inner shaft member having an enlarged, cylindrically-shaped piston portion which fits within the enlarged circular cross-section portion of said outer shaft member with a sliding fit and which presents separation of said shaft members, and means for introducing lubricant into the enlarged portion of said outer shaft, in order that said piston portion shall be operable to dampen longitudinal shocks which results during the operation of said coupling.

2. An extensible, power take-off coupling of the class described, comprising an inner shaft member and an outer shaft member, said outer shaft member being tubular in form and having an enlarged portion and a portion of reduced cross-sectional area, said portion of reduced cross-sectional area and said inner shaft member having complementary, non-circular cross-sections which are proportioned to engage each other with a sliding fit, and which interlock said shaft members for the transmission of rotary motion, said inner shaft member having an enlarged head portion which is of greater cross-sectional area than the reduced cross-sectional area portion of said outer shaft member, said head portion fitting within the enlarged portion of said outer shaft member so as to prevent longitudinal separation of said shaft members, and the end of the reduced cross-sectional area portion of said outer shaft member which is opposite said portion of enlarged cross-sectional area being provided with a ring-like reinforcing member, adapted to serve as a bumper for limiting movement of said shaft members toward each other and to strengthen said portion of reduced cross-sectional area.

3. An extensible, power take-off coupling of the class described, comprising an inner shaft member having a square cross-sectional area, and an outer shaft member, said outer shaft member being tubular in form and having an enlarged portion, which is circular in cross-section, and a portion of reduced cross-sectional area, said portion of reduced cross-sectional area having a square cross-section and being proportioned to engage said outer shaft member with a sliding fit, the interengaging surfaces of said outer shaft member and said reduced area portion serving to operatively interconnect said shaft members for the transmission of rotary motion, said inner shaft member having an enlarged, cylindrically-shaped piston portion which fits within the enlarged, circular cross-section portion of said outer shaft member with a sliding fit and which prevents longitudinal separation of said shaft members, means for introducing lubricant into the enlarged portion of said outer shaft member in order that said piston portion shall be operable to dampen longitudinal shocks which result during the operation of said coupling, and the end of the reduced cross-sectional area portion of said outer shaft member which is opposite said portion of enlarged cross-sectional area being provided with a ring-like reinforcing member, adapted to serve as a bumper for limiting movement of said shaft members toward each other and to strengthen said portion of reduced cross-sectional area.

4. An extensible, power take-off coupling of the class described, comprising an inner shaft member having a rectangular cross-section and an outer shaft member, said outer shaft member being tubular in form and having an enlarged portion, which is circular in cross-section, and a portion of reduced cross-sectional area, said portion of reduced cross-sectional area having a rectangular cross-section and being proportioned to engage said inner shaft member with a sliding fit, the interengaging surfaces of said inner shaft member and said reduced area portion serving to operatively interconnect said shaft members for the transmission of rotary motion, said inner shaft member having an enlarged cylindrically-shaped piston portion which fits within the enlarged circular cross-section portion of said outer shaft member with a sliding fit and which prevents separation of said shaft members, and means for introducing lubricant into the enlarged portion of said outer shaft, in order that said piston portion shall be operable to dampen longitudinal shocks which result during the operation of said coupling.

LEON R. CLAUSEN.

REFERENCES CITED

The following references are of record in the file of this patent:

UNITED STATES PATENTS

| Number | Name | Date |
| --- | --- | --- |
| 163,083 | Knock | May 11, 1875 |
| 1,896,901 | Knapp et al. | Feb. 7, 1933 |
| 1,973,702 | Cooke | Sept. 18, 1934 |
| 2,116,290 | Spicer | May 3, 1938 |
| 2,284,199 | Greiner | May 26, 1942 |